UNITED STATES PATENT OFFICE.

JOHN BRILL, OF PHILADELPHIA, PENNSYLVANIA, ASSIGNOR OF ONE-THIRD TO FREDERICK HEIM, OF SAME PLACE.

OBTAINING PEPSIN.

SPECIFICATION forming part of Letters Patent No. 433,395, dated July 29, 1890.

Application filed April 3, 1889. Serial No. 305,870. (No specimens.)

*To all whom it may concern:*

Be it known that I, JOHN BRILL, a citizen of the United States, residing in the city and county of Philadelphia, State of Pennsylvania, have invented a new and useful Improvement in the Method of Making Pepsin, which improvement is fully set forth in the following specification.

My invention relates to a novel manner of obtaining pepsin; and it consists in taking the stomachs of, say, two hundred hogs and finely chopping the same, then exposing the mass thus prepared to a mixture of five pounds of muriatic or sulphurous acid and about thirty gallons of water in a tank or other suitable receptacle, where it is beaten for about three hours, after which the material thus formed is put in a filter-press, where the juice, which is pure pepsin, is extracted therefrom. The juice is now clarified by means of benzine, which is poured into a tank containing the said juice, the pure pepsin being precipitated to the bottom of the tank, from whence the benzine and the impurities are removed either by siphon or otherwise. The pepsin thus obtained is placed upon glass or other suitable plates and dried. It is then ground and sieved, being then in condition for use.

Having thus described my invention, what I claim as new, and desire to secure by Letters Patent, is—

The method of obtaining pepsin, consisting in, first, taking a number of hogs' stomachs and finely chopping the same; second, in subjecting the prepared mass to the action of acid and water and beating it for about three hours; third, pressing the juice from the mass; fourth, clarifying the juice by a benzine bath and then drying the precipitated pepsin, substantially as described.

JOHN BRILL.

Witnesses:
JOHN A. WIEDERSHEIM.
L. JENNINGS.